(12) United States Patent
Huemer et al.

(10) Patent No.: US 7,801,798 B1
(45) Date of Patent: Sep. 21, 2010

(54) COMMODITY CONTRACT BID EVALUATION SYSTEM

(75) Inventors: Hartwig C. Huemer, Verona, WI (US);
Robert D. Pierce, Albany, CA (US);
Charles R. Troyer, New York, NY (US)

(73) Assignee: SignalDemand, Inc., San Francisco, CA (US)

( * ) Notice: Subject to any disclaimer, the term of this patent is extended or adjusted under 35 U.S.C. 154(b) by 968 days.

(21) Appl. No.: 11/200,776

(22) Filed: Aug. 9, 2005

(51) Int. Cl.
*G06Q 40/00* (2006.01)
(52) U.S. Cl. .......................................... 705/37; 705/35
(58) Field of Classification Search ................... 705/35, 705/37
See application file for complete search history.

(56) References Cited

U.S. PATENT DOCUMENTS

| | | | |
|---|---|---|---|
| 5,604,854 A | 2/1997 | Glassey | |
| 5,926,822 A | 7/1999 | Garman | |
| 6,092,050 A | 7/2000 | Lungren et al. | |
| 6,456,982 B1 | 9/2002 | Pilipovic | |
| 6,553,352 B2 | 4/2003 | Delurgio et al. | |
| 6,851,604 B2 | 2/2005 | Girotto et al. | |
| 6,892,195 B2 | 5/2005 | Lee et al. | |
| 7,113,190 B2* | 9/2006 | Heaton | 345/440 |
| 2001/0037321 A1 | 11/2001 | Fishman et al. | |
| 2003/0110072 A1 | 6/2003 | Delurgio et al. | |
| 2004/0128261 A1* | 7/2004 | Olavson et al. | 705/400 |
| 2005/0097025 A1* | 5/2005 | Horton et al. | 705/37 |
| 2005/0144061 A1* | 6/2005 | Rarity et al. | 705/10 |

\* cited by examiner

*Primary Examiner*—James A Kramer
*Assistant Examiner*—James A Vezeris
(74) *Attorney, Agent, or Firm*—Treyz Law Group; G. Victor Treyz; David C. Kellogg

(57) ABSTRACT

A bid evaluation tool is provided for evaluating proposed bids for commodity sales contracts. The tool displays historical price data and forecasts in a graph. A user of the tool defines a date range for a proposed contract by entering starting and ending dates for the contract. The tool analyzes price data for the date range and generates a corresponding proposed bid for the date range. A bid window may be used to gather user inputs for the tool. The user can select between multiple bid pricing models for the bid evaluation tool to use when processing the price data to produce the proposed bid. Bid models for the tool include models such as a flat average model, a linear fit model, and an offset model. The user can adjust which historical data is included in the graph and can select which data set is used to generate bids.

22 Claims, 11 Drawing Sheets

COMMODITY CONTRACT BID EVALUATION SYSTEM

BACKGROUND OF THE INVENTION

This invention relates to tools for evaluating contract bids, and more particularly, to systems and methods for evaluating bids for the sale of seasonal commodities.

Markets for perishable commodities have a number of distinctive characteristics. The commodity being sold generally cannot be stored for a long period of time due to cost considerations and the perishable nature of the commodity (e.g., meat). Because the product being sold cannot be stored for a long period of time, its market price is sensitive to seasonal pressures. Large price fluctuations between summer and winter are common. The inability to store product for an extended period of time also forces sellers to clear their product in a timely fashion to avoid significant financial loss. Market competition is often keen, which keeps profit margins low and places further pressure on sellers.

Because of these constraints, it is difficult to determine the fair market price for a commodity contract. Sellers therefore have difficulty in preparing contract bids. If a bid is based on insufficient information or a poor evaluation of market data, a seller may either receive a price for the commodity that is too low or may bid too high and lose a sale.

It is therefore an object of the present invention to provide a tool for evaluating commodity bids.

SUMMARY OF THE INVENTION

In accordance with the present invention, systems and methods for evaluating commodity bids are provided. A bid evaluation tool is implemented on computing equipment. The bid evaluation tool may be used by a seller to generate a proposed bid for a contract to be executed over a particular period of time in the future. The proposed bid may be generated by the bid evaluation tool based on historical and forecast data.

A bid that has been generated by the bid evaluation tool may be displayed in context. For example, the bid may be displayed on a graph in which historical data and forecast data is presented simultaneously. The historical and forecast data may include, as an example, maximum and minimum actual sales prices obtained by the seller for the last two years and forecast average, maximum, and minimum prices. By displaying the bid visually in the context of relevant pricing data, a seller or other user can determine whether the bid is satisfactory.

The bid evaluation tool may support automated ordering features. A seller using the tool may evaluate and place a bid for the sale of a commodity. After the bid has been accepted, the seller may transmit an order to a production facility. When the order is received, the production facility can fulfill the order and deliver the commodity to the buyer.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
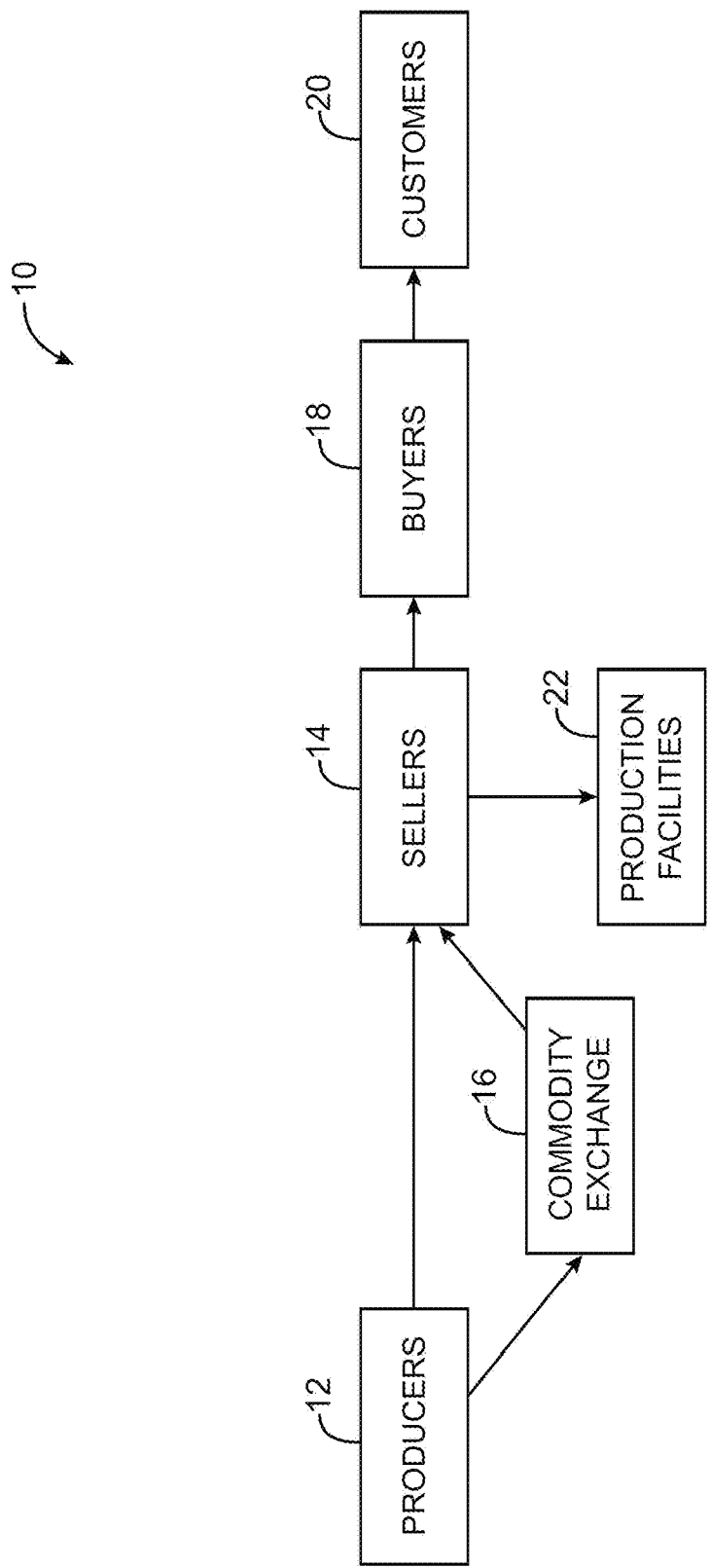
FIG. 1 is a diagram showing parties involved in buying and selling commodities in accordance with the present invention.

The present invention relates to commodity contracts, and more particularly, to tools to assist users in evaluating bid prices for commodity contracts.

A variety of products are sold as commodities. Some of these commodities are not perishable such as gold, silver, or other precious metals. These commodities can be stored for an extended period of time. Although demand can fluctuate, suppliers of this type of commodity are able to moderate the effects of demand fluctuations by storing product during periods of low demand and releasing product during periods of high demand. As a result of the availability of long-term storage, price fluctuations for non-perishable commodities are moderated and tend not to be highly seasonal.

Other commodities are highly sensitive to seasonal forces. These commodities are generally characterized by being perishable and difficult to store. Examples of these commodities include meat, grain, lumber, and petroleum. Some of these commodities are highly perishable such as meat. Meat must generally be consumed within a relatively short time after it has been produced from cattle. Other commodities such as grain are not as perishable as meat, but still may not be stored for an extended period of time without a risk of spoilage. Lumber and petroleum, while not as perishable as meat, can be expensive to store, which encourages sellers to clear these items in a much shorter time than commodities such as gold and silver. This, in turn, makes commodities such as lumber and petroleum subject to seasonal effects.

The nature of many of the contracts for these commodities requires delivery of product over a period of time. As an example, a supermarket chain might contract for the delivery of a certain amount of meat each week for a two month period. Contracting for the delivery of meat over a relatively long contract term (e.g., two months) allows the supermarket to satisfy its projected demand for meat in advance.

The desire to price the commodity fairly for an extended contract term and the seasonal fluctuations in market price make commodities that are subject to seasonal demand pressures difficult to price.

Sellers have traditionally relied on charts or tables of historical sales prices as a guide. Even with the assistance of these pricing aids, however, accurate pricing is often more of an art than a science. Without adequate tools, it is not possible for sellers to make truly informed bids. Traditional bid pricing techniques do not allow sellers to evaluate bid pricing in the context of appropriate historical and forecast data, so sellers are frequently left guessing as to the appropriate market price and risk level that applies during the term of a proposed contract.

In accordance with the present invention, a bid evaluation tool is provided that assists users in determining a fair bid for a commodity contract. The bid evaluation tool may be used by sellers, buyers, interested third parties, or any other suitable user, but is described herein primarily in the context of use by sellers for clarity.

An overview of an environment 10 in which seasonal commodities are bought and sold is shown in FIG. 1. In a typical scenario, commodity producers 12 produce the commodity. For example, if the commodity is grain, the commodity producers include farmers. In some industries, there are multiple levels of producers. For example, individual farmers may grow crops and a crop purchasing company may buy a farmer's output. The crop purchasing company in this example may be considered to be a type of producer 12.

The commodity that is produced by producers 12 may be sold directly to sellers 14. Sellers 14 are typically wholesalers that resell the commodity to retail buyers 18. As an example, sellers 14 may be meat packers and buyers 18 may be supermarket chains. Both sellers 14 and buyers 18 may include multiple layers of entities. For example, sellers 14 may include wholesalers who buy product from producers 12 and sell product to buyers 18. Sellers 14 may also include distributors who buy from producers 12 and sell to other wholesalers or who buy from wholesalers 14 and resell to buyers 18. Buyers 18 may include retailers who buy product from sellers 14 and who resell product directly to customers 20 (e.g., a supermarket that buys meat from a packer and who sells the meat to an individual consumer). Buyers 18 may also include distributors who buy product from multiple sellers and who resell product to retailers. Customers 20 might also have multiple levels—e.g. a caterer might purchase meat from a supermarket and resell it as cooked food to a customer.

The bid evaluation tool of the present invention will often be described in the context of a seller 14 who is interested in making a bid for a contract to sell a commodity to a buyer 18. During this discussion it will generally not be necessary to distinguish between various different possible levels of producers, sellers, buyers, and customers or to consider situations in which the user of the bid evaluation tool is associated with a producer, buyer, or customer. In general, however, the bid evaluation tool may be used by any suitable entity and the entities of FIG. 1 may have any suitable number of levels.

In some industries, producers can sell futures contracts on a commodity exchange 16. Not all commodities have available exchanges 16 on which to sell futures. Moreover, in many situations producers 12 only sell futures contracts on commodity exchange 16 as a hedge against unexpected market fluctuations. Most production is typically sold directly to sellers 14.

When a seller 14 and buyer 18 agree on contract terms, a seller 14 can send an order to one or more production facilities 22 electronically using the bid evaluation tool. Production facilities process raw supplies of the commodity into the form of the commodity that is required by the buyer 18. For example, if the commodity being sold by a seller 14 to a buyer 18 is lumber of a certain size and type, production facility 22 may be used to convert timber from the producers 12 into lumber having the size and type desired by the buyer 18. The production facility (a sawmill in this example) preferably receives orders from sellers 14 electronically.

Figure 2:
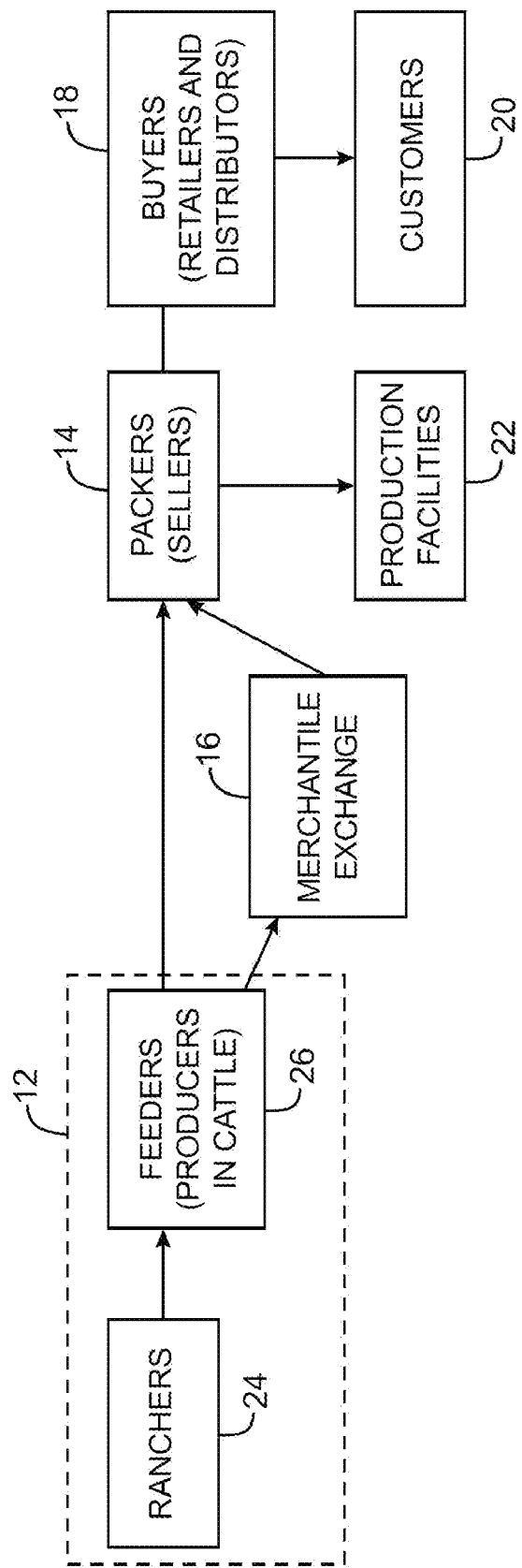
FIG. 2 is a diagram showing parties involved in buying and selling meat in accordance with the present invention.

The identities of the entities shown in FIG. 1 depend on the nature of the commodities being bought and sold. An example is given in FIG. 2. In the example of FIG. 2, the entities 10 are involved in the production and distribution of meat. Producers 12 include ranchers 24 and feeders 26. Ranchers 24 raise cattle, which are sold to feeders 26. Feeders 26, in turn, sell cattle futures contracts on a mercantile exchange 16 (i.e., the Chicago Mercantile Exchange) and sell cattle to packers 4. Packers 14 work with production facilities 22 to produce various types of meat from the cattle.

Sellers 14 bid on contracts to supply packaged meat to buyers 18. Buyers 18 typically include entities such as distributors, large restaurant chains, supermarket chains, etc. The retail buyers 18 sell the meat to consumers 20 in supermarkets and restaurants.

The bid evaluation tool of the present invention may be used by the packers 14 to help the packers 14 make accurate bids on their contracts with buyers 18. The bid evaluation tool may also be used to place electronic orders with meat packing facilities 22. Packing facilities 22 may be owned by the packers 14 or may be owned by other organizations.

The bid evaluation tool may be implemented by software running on computer hardware. The software includes code that is stored on storage media such as a computer hard disk. During operation, the code is executed using computer processors and memory. When executed, the code performs the operations of the bid evaluation tool such as gathering user inputs, processing user inputs and other data, displaying information on computer display screens, and placing orders.

Figure 3:
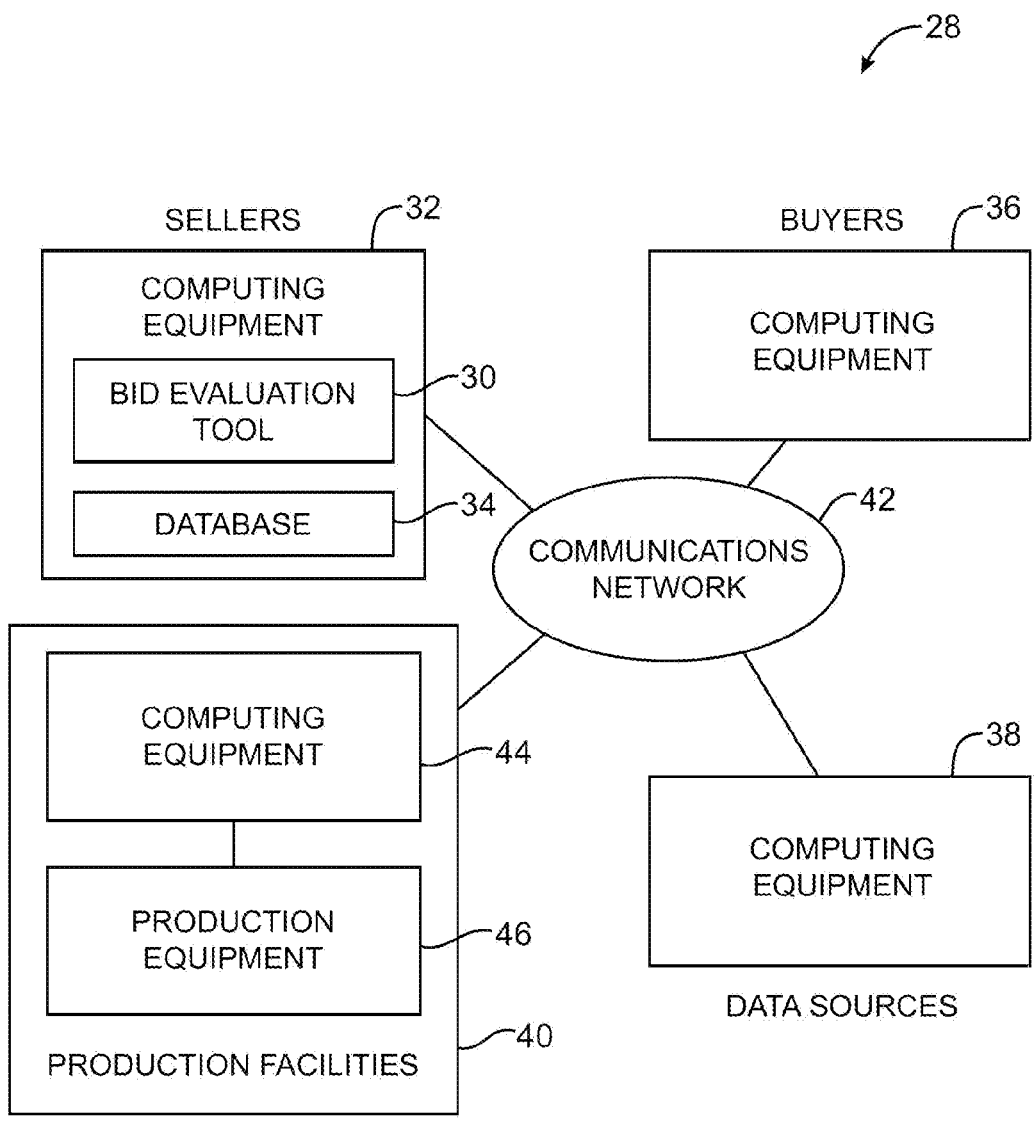
FIG. 3 is a diagram of an illustrative system environment in which the bid evaluation tool operates in accordance with the present invention.

A typical bid evaluation system 28 in which a bid evaluation tool 30 is used is shown in FIG. 3. In the example of FIG. 3, bid evaluation tool 30 is implemented using computing equipment 32 associated with a seller. This is merely illustrative. The bid evaluation tool 30 may be used by any suitable entity interested in evaluating contract pricing.

The bid evaluation tool 30 may be used to evaluate bids for contracts for the sale of products such as manufactured products, commodities, seasonal commodities, etc. The bid evaluation tool 30 is often discussed in the context of commodity bid evaluation for the meat industry as an example.

As shown in FIG. 3, various entities in the system may have computing equipment. Sellers have computing equipment 32. Buyers may have computing equipment 36. Computing equipment 44 is used at production facilities 40. Computing equipment 38 is also used by data sources, which may include historical data sources, sources of market pricing data such as governmental sources, mercantile exchange data sources, and other suitable sources of commodity pricing and economic data.

Computing equipment 32, 36, 44, and 38 may be based on one or more computers such as mainframe computers, workstations, personal computers, handheld computers, networks of computers, or any other suitable digital processing equipment. Computing equipment 32, 36, 44, and 38 includes processors and storage (e.g., volatile and non-volatile memory, hard drives and other storage media, etc.). Computing equipment 32, 36, 44, and 38 is preferably linked electronically by paths through network 42. Network 42 may be any suitable network such as a network formed from local area networks (LANs) and wide area networks (WANs). Network 42 may be based on the internet and/or other suitable wired and wireless networks that permit the entities of FIG. 3 to communicate electronically.

As shown in FIG. 3, sellers are provided with computing equipment 32 on which bid evaluation tools such as bid evaluation tool 30 have been implemented. The bid evaluation tool 30 works with database 34. Database 34 may be made up of one or more smaller databases if desired. Database 34 includes data such as historical price and economic data and user input data (e.g., user data obtained from personnel using the bid evaluation tool 30 at a seller).

Data may be included in database 34 that results from a given seller's own sales activities (e.g., a seller's sales history over a period of time, a record of sales that the seller has made to a particular buyer, etc.). Database 34 may also include economic data (e.g., inflation rate data) and general industry data (e.g., cattle futures prices derived from the cattle futures that are bought and sold on the Chicago Mercantile Exchange). This data may be conveyed to database 34 from computing equipment 38 over network 42.

The data in database 34 is used by bid evaluation tool 30 to produce proposed bids. In FIG. 3, a single bid evaluation tool 30 is shown as being shared by multiple sellers. This is merely illustrative. In general, any suitable architecture may be used. For example, each seller may have its own copy of a locally-implemented tool or suite of tools. A shared hosting arrangement may also be used in which multiple sellers log in to a server-based tool over the internet. Combinations of these approaches may be used if desired.

Sellers preferably use computing equipment 32 such as bid evaluation tool 30 to generate electronic orders for production facilities 44. The orders are conveyed electronically over communications network 42. Production facilities 40 use computing equipment 44 to receive orders from the sellers. Production facilities 40 use production equipment 46 to fulfill the orders that are received. The output of the production facilities 40 can then be delivered to appropriate buyers.

Buyers typically use computing equipment 36 to communicate electronically with other entities in system 28. For example, buyers can consummate deals with sellers at equipment 32 over network 42, buyers can communicate with production facility computing equipment 44 to check on the status of an order, etc.

Figure 4:
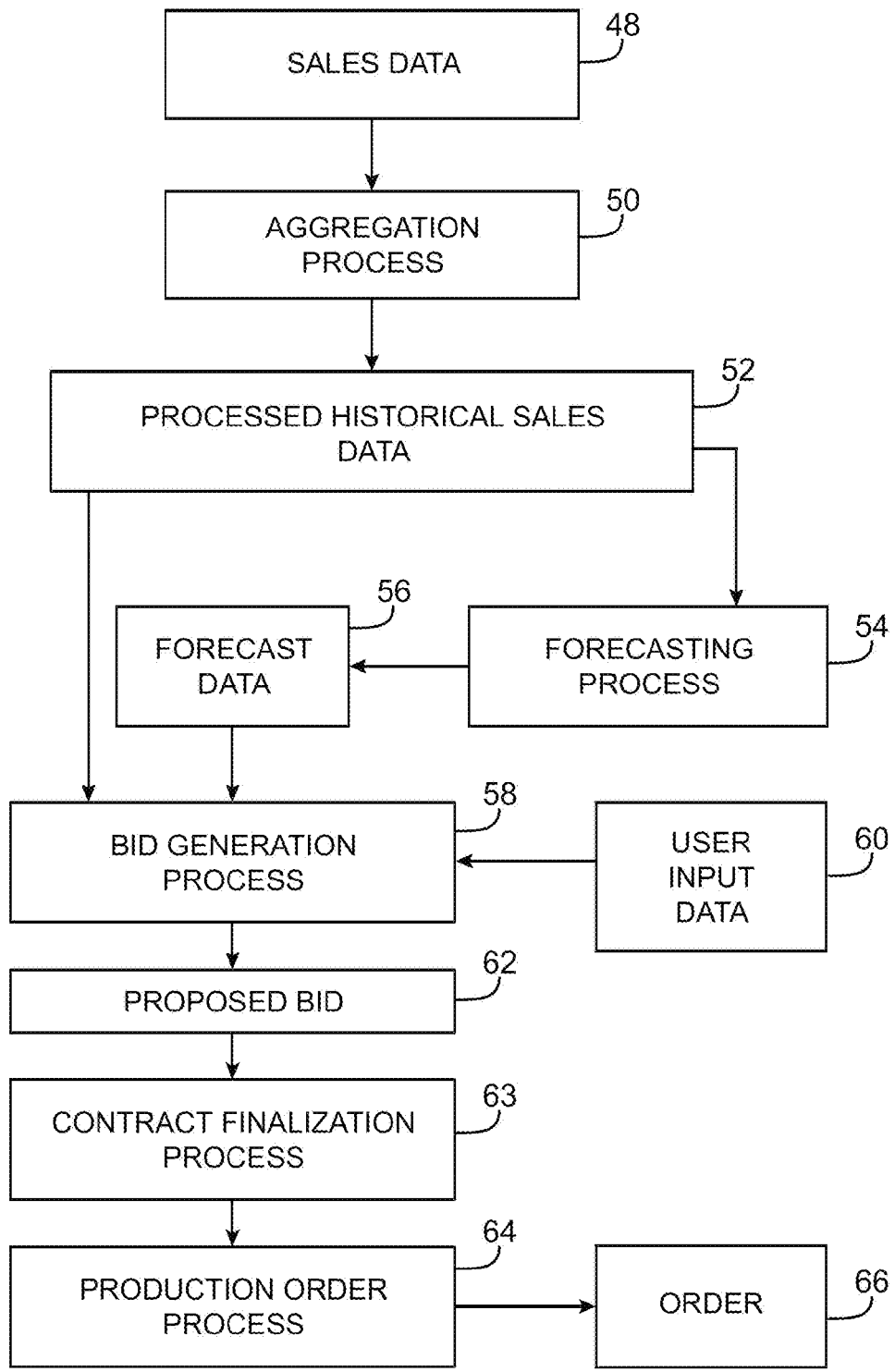
FIG. 4 is a chart showing how data is processed during bid evaluation and order generation operations using the bid evaluation tool in accordance with the present invention.

A diagram showing how data is processed in system 28 is shown in FIG. 4. Sales data 48 includes data on actual sales transactions. Sales data 48 may be obtained from any suitable source. Sales data 48 typically includes information such as details on the particular type of commodity sold (e.g., which cut of meat when the commodity is meat), quantity information, buyer identity information (where applicable), date of sale, etc. Sales data 48 preferably includes a given seller's historical sales data and contains information on the prices of the seller's previous sales to multiple buyers. Data 48 may include sales data for multiple groups or classes of buyers.

Aggregation process 50 is used to process sales data 48. For example, aggregation process 50 may extract a subset of sales data from data 48 to facilitate subsequent analysis and to provide more accurate context information for bid preparation. The aggregation process 50 may handle operations such as dataset merge operations that are used to place sales data 48 into a suitable format for downstream processing.

The aggregation process preferably allocates transaction sales data to regular time periods. For example, a seller's sales data may be associated with particular days. Aggregation process 50 may be used to allocate these sales to appropriate weekly time periods. As another example, certain sales databases may contain data formatted with a different date periodicity than desired such as a monthly periodicity rather than a weekly periodicity. During aggregation, the monthly data can be processed to produce corresponding weekly data. The regularity produced by the aggregation processing of process 50 makes the data more suitable for use in subsequent forecasting and display operations. If desired, sales data from multiple sellers and/or external data sources may be aggregated by process 50. Such sales data may be normalized or otherwise processed using inflation data and other economic data, commodity prices from a futures exchange, etc. Further data cleansing operations such as smoothing or interpolation may also be employed. Such processing may be performed by aggregation process 50 or other bid tool processes.

The aggregation process 50 produces processed historical sales data 52. The historical sales data includes historical pricing information for the commodity being sold by the seller. Any suitable format may be used for the price data. For example, if the seller is selling meat, the processed historical sales data 52 may include meat prices in the form of price per pound for various cuts of meat. Different price data formats may be used for different commodities.

To provide accurate historical price coverage, it may be desirable to include price data for a relatively long period of time. As an example, one year of price data, two years of price data, five years of price data, or more than five years of price data may be included. In the meat commodity business, sales dates typically coincide with the weeks of the year. There are therefore typically 52 sales dates associated with a particular year. Other industries may make sales using a different calendar format (e.g., daily sales, monthly sales, etc.)

The processed historical sales data 52 is processed by a forecasting process 54. Any suitable model may be used for forecasting process 54. For example, process 54 may use auto-regressive techniques to predict future sales prices for the commodity based on historical data 52. Forecasting process 54 may also use past and predicted inflation data and other economic data and data from external sources such as historical and current commodity futures pricing data. Forecasting process 54 produces forecast data 56 as an output. With one suitable arrangement, the forecast data 56 is provided in the same format that is used for historical sales data. For example, in a meat commodity scenario, both the historical data 52 and forecast data 56 may be provided using a weekly price-per-pound format.

The bid generation process 58 receives the processed historical sales data 52 and forecast data 56 as inputs. Bid generation process 58 also receives user input 60. User input 60 includes user-supplied settings for the bid evaluation tool 30 such as display format, database selections, bid evaluation formats, etc. The user-supplied input data 60 is typically supplied by personnel associated with the seller by clicking on on-screen options provided by the bid evaluation tool 30. In general, the input data for the bid generation process 58 includes inputs that have been adjusted by the user and default settings.

The bid generation process 58 processes data such as the historical sales data 52, the forecast data 56, and user input data 60 and produces a corresponding proposed bid 62 (also sometimes referred to as the bid to be evaluated or the proposed price or evaluation price). The proposed bid is preferably displayed on a computer display in a screen that also contains context data.

Context data preferably includes historical data indicating the historical prices for comparable commodity sales and forecast data. By presenting the proposed bid in context, the seller (or other user) can evaluate whether the price is fair. The seller can also evaluate related factors such as historical and predicted price trends and volatility. If seasonal forces indicate that a price will be rising or falling rapidly during a contract or indicate that the contract term covers a period of time that is characterized by volatile prices (and therefore increased risk), the seller may modify the proposed bid before conveying the bid to the buyer.

A seller may convey a bid to a potential buyer using any suitable format (e.g., over the telephone, via fax, via email, using a web site or other online format, etc.). A buyer can accept the bid using any suitable format (e.g., over the telephone, via fax, via email, using a web site or other online format, etc.). With one suitable arrangement, the bid is conveyed electronically from a seller's computing equipment 32 to a buyer's computing equipment 36 over network 42 and the buyer's acceptance of the bid to form a contract is conveyed electronically from computing equipment 36 to computing equipment 32 over network 42 using contract finalization process 63.

Following acceptance of the proposed bid by the buyer, a seller can initiate the contract fulfillment process. For example, a seller can use a production order process 64 to process an order. Process 64 preferably uses information on contracts that have been consummated to automatically convey corresponding electronic orders 66 to production facilities 40 (FIG. 3). Production facilities 40 can use equipment 44 to receive the order from the seller and can use production equipment 46 to fulfill the production obligations associated with the order.

Any suitable hardware and software arrangement may be used to implement the processes and data structures illustrated in FIG. 4. With one suitable arrangement, sales data 48, processed historical sales data 52, forecast data 56, bid 62, and order data 66 are maintained in records in one or more databases such as database 34. Bid evaluation tool 30 (FIG. 3) may be used to implement aggregation process 50, forecasting process 54, bid generation process 58, and production order process 64. If desired, some of the operations of FIG. 4 may be performed by stand-alone software components such as a data preprocessing software component and an electronic order software component. Regardless of whether the functionality of FIG. 4 is implemented using a single software component or a software suite, the operations of FIG. 4 are referred to herein as being performed by bid evaluation tool 30.

Figure 5:
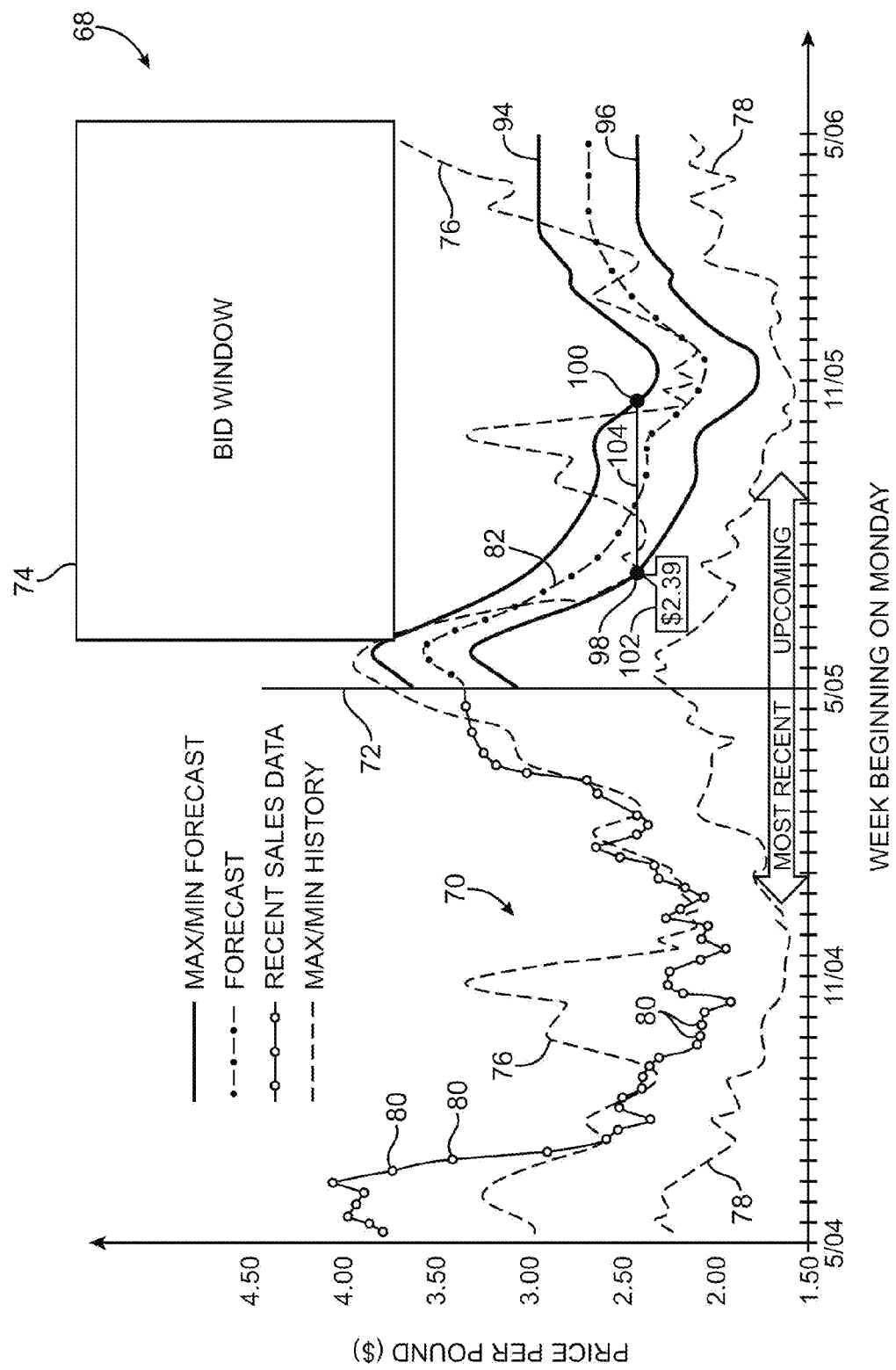
FIG. 5 is an illustrative screen that may be displayed by the bid evaluation tool of the present invention.

The bid evaluation tool 30 displays commodity pricing information visually. An illustrative bid evaluation screen 68 that may be displayed for a user by the bid evaluation tool 30 is shown in FIG. 5. Screen 68 is displayed on a computer monitor that is part of the computing equipment running the bid evaluation tool 30. If desired, the contents of screen 68 may be printed using a printer in the computing equipment.

The bid evaluation screen 68 preferably contains a graph 70 and a bid evaluation window 74. Graph 70 may be displayed using any suitable format (e.g., unnormalized prices on the y-axis or prices on the y-axis that have been normalized by dividing historical and/or forecast data or other suitable normalizing data into the price data). In the example of FIG. 5, the commodity being sold is meat, so the price on the y-axis of graph 70 is given in dollars per pound. The x-axis of graph 70 is divided into weeks of the year. The current date (May 2005) is given in the center of the x-axis (represented by line 72). Data to the left of line 72 corresponds to past events. Data to the right of line 72 includes historical data (past events), forecast data, and proposed bid data.

A bid window 74 is preferably displayed as an inset or overlay on top of the rest of the information in screen 68. Bid window 74 contains on-screen options that allow the user to control the operation of the bid evaluation tool 30. Using window 74, the user can adjust display settings that affect the presentation of pricing data in graph 70 and can choose from among various options for pricing models and bid formats. The window 74 preferably also contains an order option that allows the user to place an electronic order with a production facility.

Graph 70 preferably contains historical data. Any suitable format may be used for presenting historical price data. In the example of FIG. 5, the historical data that is presented includes maximum sales price data and minimum sales price data. The maximum sales price data is given by line 76. Line 78 represents the minimum or lower bound of the historical price data. Historical price data such as the maximum and minimum price data represented by lines 76 and 78 may be associated with any suitable time period. For example, if the user instructed the bid evaluation tool 30 to display data for the last two years, the maximum and minimum curves 76 and 78 would be adjusted to represent the actual commodity sales prices achieved by the seller over the last two years. As the graph 70 of FIG. 5 demonstrates, there is a strong seasonality in the pricing of the commodity (meat in this example) that is being sold. During the winter months, prices are significantly lower than in the summer months. Moreover, the spread between the maximum prices of line 76 and the minimum prices of line 78 is generally greater during the summer, indicating that price volatility is greatest in the summer.

When additional years are included in the range covered by the historical data, the maximum and minimum lines 76 and 78 will tend to become smoother. If desired, data from multiple historical date ranges can be displayed in graph 70 at the same time. An example of an arrangement that may be used to display multiple ranges of historical data simultaneously in graph 70 is shown in FIG. 6.

Figure 6:
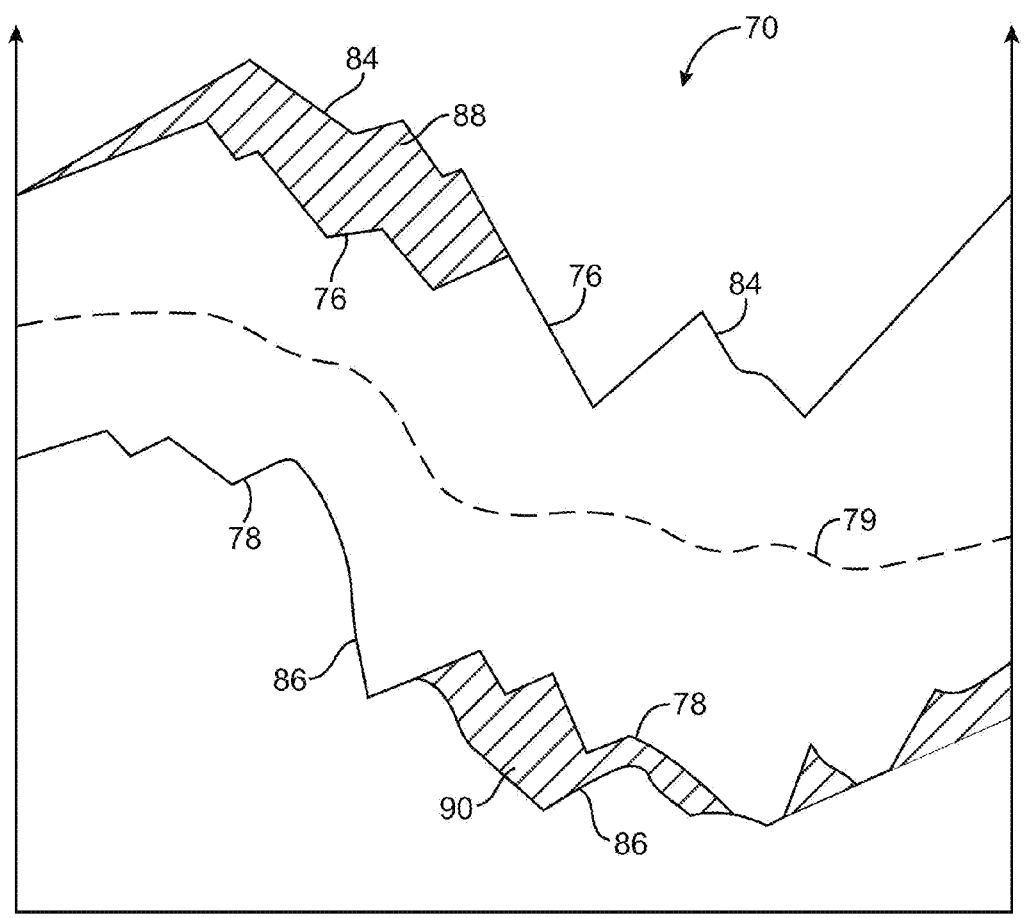
FIG. 6 is an illustrative display format that may be used to display pricing data on a bid evaluation screen such as the screen of FIG. 5 in accordance with the present invention.

In FIG. 6, curve 76 represents the maximum sales price over the last two years. Curve 78 represents the minimum sales price over the last two years. Taken together, curves 76 and 78 therefore present a visual representation of the historical sales data corresponding to a date range of the last two years.

In the example of FIG. 6, the user has directed the bid evaluation tool 30 to simultaneously display data for another date range. In particular, the user has requested that historical maximum and minimum prices be displayed over a five-year range. The five-year maximum is given by line 84. The five-year minimum is given by line 86. As shown by FIG. 6, the two-year data and five-year data often coincide, so that lines 76 and 84 often lie on top of each other and lines 78 and 86 often lie on top of each other. However, occasionally during the past five years, the maximum sales price has exceeded the maximum sales price in the last two years. This disparity is represented by the divergence between curves 84 and 76 and the shaded area 88. Similarly, the minimum sales price in the last five years has sometimes differed from the minimum sales price in the last two years, as represented by the divergence between lines 78 and 86 and shaded area 90.

FIG. 6 also illustrates how the user can direct the bid evaluation tool 30 to display average price information. In the example of FIG. 6, average price curve 79 represents a historical average of sales price data for the last five years.

In the example of FIG. 5, price data for commodity sales made in the last year are shown by individual data points such as data points 80. The data points 80 may be connected by a line to create a curve. Because the data points 80 represent past data, the points 80 do not extend to the right of line 72.

The bid evaluation tool 30 can display both historical data (such as maximum and minimum lines 76 and 78) and forecast data to the right of line 72. In the example of FIG. 5, forecast data is represented by line 82. Line 82 may be computed by bid evaluation tool using any suitable forecasting technique.

With one suitable approach, an auto-regressive time-series model is used. Forecasts of this type use equations such as equation 1 to compute prices P(t) at time t.

$$P(t)=a_1P(t-1)+a_2P(t-2)+\ldots a_nP(t-n)+F(t) \quad (1)$$

In equation 1, t is a regular discrete time period and P(t) represents a forecast price. Forecast price P(t) is calculated based on historical price data P(t−i), where parameter i is an integer representing a suitable time period such as a day or a week). Coefficients $a_1, a_2, \ldots a_n$ are selected to give a good fit between model predictions and historical pricing data. Seasonal trends are taken into account by the term F(t), which represents seasonal background and/or economic trend data (e.g., inflation data, commodity futures data, etc.).

Figure 7:
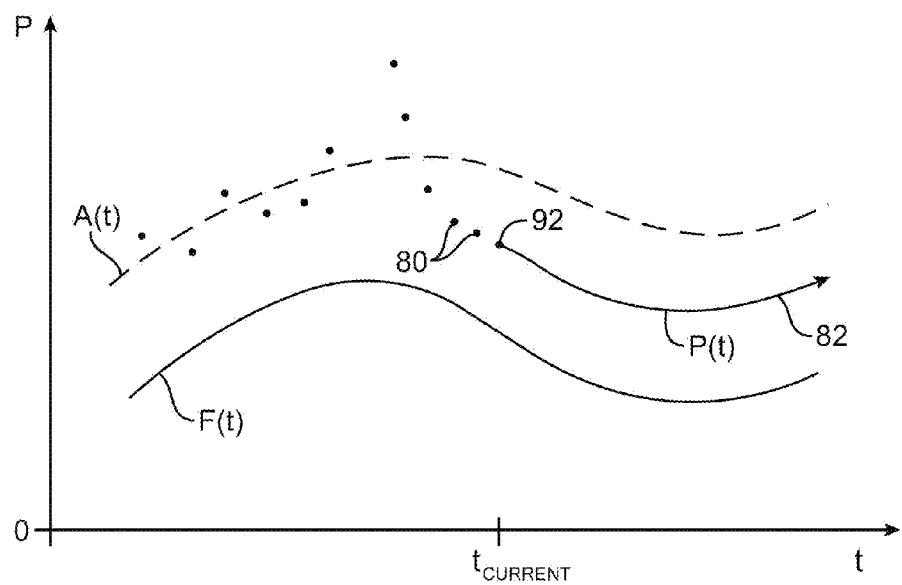
FIG. 7 is a graph illustrating how a forecast may be made by the bid evaluation tool in accordance with the present invention.

An illustrative forecast 82 that has been created by bid evaluation tool 30 using an auto-regressive model of the type defined by equation 1 is shown in FIG. 7. In this example, line 82 represents forecast P(t). Seasonal trend F(t) represents the up and down price fluctuations in the commodity due to seasonal effects. As shown in this example, historical price data 80 (e.g., price data before the present time $t_{current}$) sometimes deviates from historical average A(t). In particular, at time $t_{current}$, the price data point 92 is significantly below average $A(t_{current})$. This variation between the historical data and the current data is captured by equation 1 and is reflected in the forecast 82 for times later than $t_{current}$. As this example demonstrates, forecast P(t) is a result of combining current price data with historical data and takes both current and historical effects into account.

As shown in FIG. 5, forecast curve 82 may be displayed in the same graph 70 as the historical curves 76 and 78 and the recent price data 80. Forecast curve 82 represents a predicted average price for the commodity as a function of time. If desired, forecast maximum and minimum sales prices may also be presented in graph 70, as shown by forecast maximum curve 94 and forecast minimum curve 96. The distance between curves 94 and 96 represents the uncertainty in the forecast price. As shown by the example of FIG. 5, the inclusion of maximum and minimum forecast data therefore presents the user with an indicator of predicted price certainty. When curves 94 and 96 are separated by a large vertical distance for a particular date, for example, the user can conclude that the bid evaluation tool 30 predicts that there will be a large uncertainty in the price at that date. The user therefore is provided with context for making a bid. This context information supplements the historical curves such as curves 76 and 78.

The bid evaluation tool 30 preferably automatically calculates a proposed bid price based on a user-selected data set. In general, the tool 30 can use historical data, forecast data, and user input data in generating the proposed bid. A window such as window 74 or other suitable graphical user interface may be used to gather information from the user on a desired date range for a commodity sales contract. The user may, as an example, define a range of a month in length at a date starting two months in the future. Using this information and using a user-selected or default data set, the bid evaluation tool 30 computes an appropriate price for the seller to bid on the contract. Information on the proposed bid price is preferably displayed visually on screen 68.

In the example of FIG. 5, the starting and ending dates for the contract are represented by the horizontal axis positions of points 98 and 100. The proposed bid price produced by the bid evaluation tool 30 is shown in text in box 102 and is represented graphically by the vertical axis position of points 98 and 100. Points lying between endpoints 98 and 100 are also used to represent the proposed bid price. In the example of FIG. 5, the points connecting endpoints 98 and 100 are represented by line 104. Because the information on the proposed bid price is shown visually at the same time as the forecast and historical data of graph 70, the user is provided with context information that is helpful in allowing the user to make an informed decision on whether to submit the proposed bid to the buyer 18.

Figure 8:
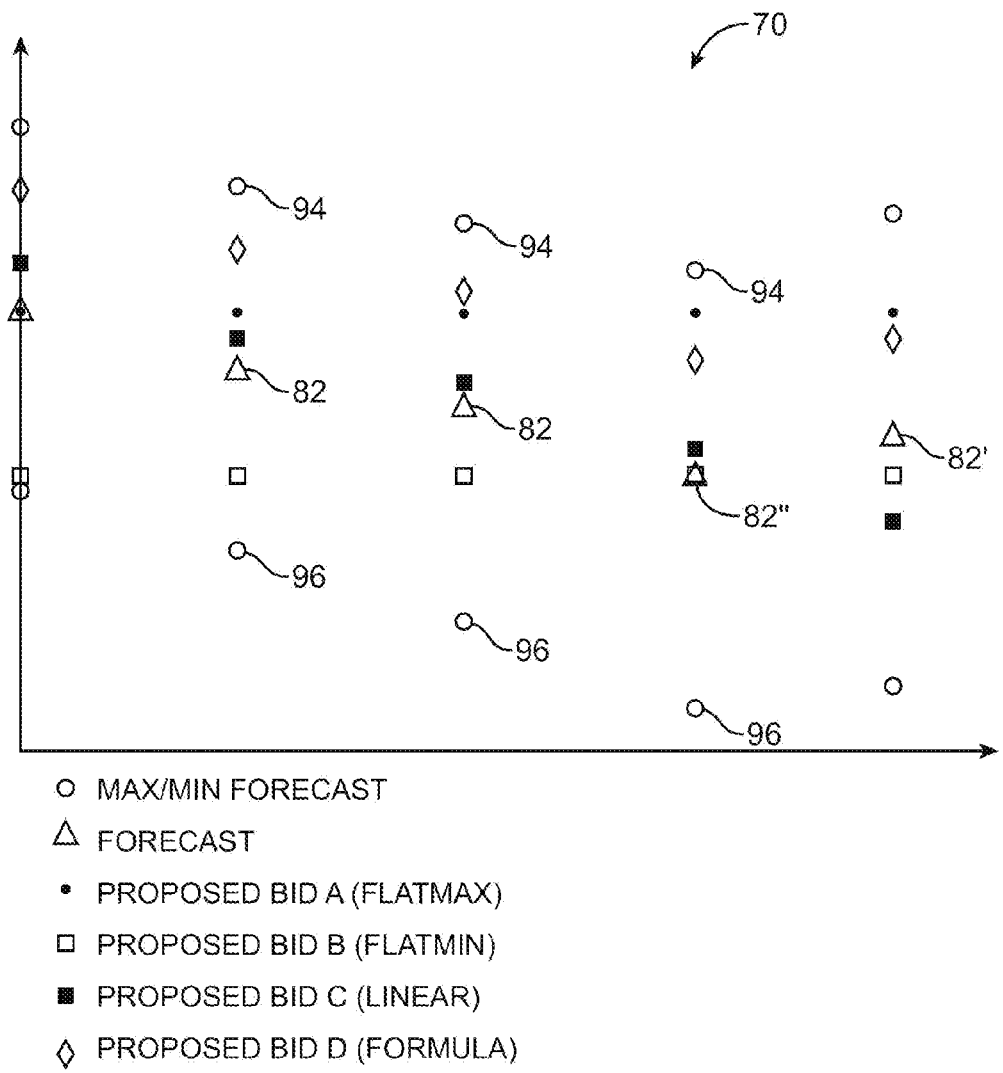
FIG. 8 is a portion of an illustrative bid evaluation screen showing how various bid formats may be used when evaluating proposed bids in accordance with the present invention.

The bid evaluation tool 30 can compute proposed bids and display proposed bid information using multiple formats. An example is shown in FIG. 8. In this example, the displayed portion of graph 70 includes forecast data points 82, 94, and 96. Data points 82 represent an average forecast of the market price for the commodity. Data points 94 represent an expected upper limit for the market price. Data points 96 represent a lower limit for the forecast. The points other than the forecast points in FIG. 8 represent proposed bid prices generated by the bid evaluation tool 30. In the example of FIG. 8, multiple proposed bid prices are displayed at the same time, which allows the user to compare different proposals. If desired, the user may adjust display settings to display fewer simultaneous proposed bid prices.

The proposed bid prices that the bid evaluation tool 30 is displaying in the portion of graph 70 in FIG. 8 correspond to four illustrative bid methodologies.

With the first methodology, the proposed bid (proposed bid A) is generated at a flat bid price that is tied to the maximum value over the applicable data set. In this example, the selected data set for generating the proposed bid is the forecast data set, so the flat bid price for proposed bid A is based on the maximum value of the forecast 82 during the term of the contract. The values of bid A are represented by the solid dots of FIG. 8.

With the second methodology, the proposed bid (proposed bid B) is generated at a flat bid price based on the minimum value of the forecast 82 during the contract term. The values of bid B are represented by the open squares of FIG. 8. Because these are flat bids, the bid price does not vary during the entire term of the contract. With this type of contract, the commodity is sold to the seller at the same price at the end of the contract that is used at the beginning of the contract. A flat bid methodology of this type based on an average forecast price was used to generate the flat bid represented by line 104 in FIG. 5.

With the third methodology shown in FIG. 8, the proposed bid is generated by tool 30 using a linearly-varying and, in this example, non-flat bid price. This is shown by the solid squares in FIG. 8 (proposed bid C). The price of bid C falls as the contract progresses, which reflects the forecast drop in market price for the commodity with increasing time. The last forecast price 82' has a higher value than the next to last forecast price 82", but the linear methodology does not capture this rise, because a fixed bid price slope is used.

With the fourth bid price methodology shown in FIG. 8, the proposed bid (proposed bid D) is generated from the forecast price data 82 using a formula. The formula may be a user-defined formula or a default formula preprogrammed into the bid evaluation tool 30. The formula may be, for example, a price-plus formula in which a fixed dollar amount is added to the forecast price for each week (or other suitable sales period). The formula may also use a ratio to calculate the proposed price (e.g., by multiplying the forecast points 82 by 1.1 to generate a desired profit margin). These are merely illustrative examples of suitable formulas that may be used by bid evaluation tool 30 to calculate proposed bids for the user.

In the scenario of FIG. 8, the data set on which the proposed bid was based was the average forecast data 82. This is merely an example of the type of data set that may be used to generate the proposed bid price. Other suitable data sets include historical data such as the most recent 52 weeks of the seller's price data, a two-year average of the seller's historical price data, a five-year maximum of the seller's historical price data, etc. If desired, factors such economic correction factors or other adjustment factors can be used to adjust or normalize the data sets used for generating the proposed bid. The data set that is to be used in generating the proposed bid may be selected by the user or may be assigned as a default.

Figure 9:
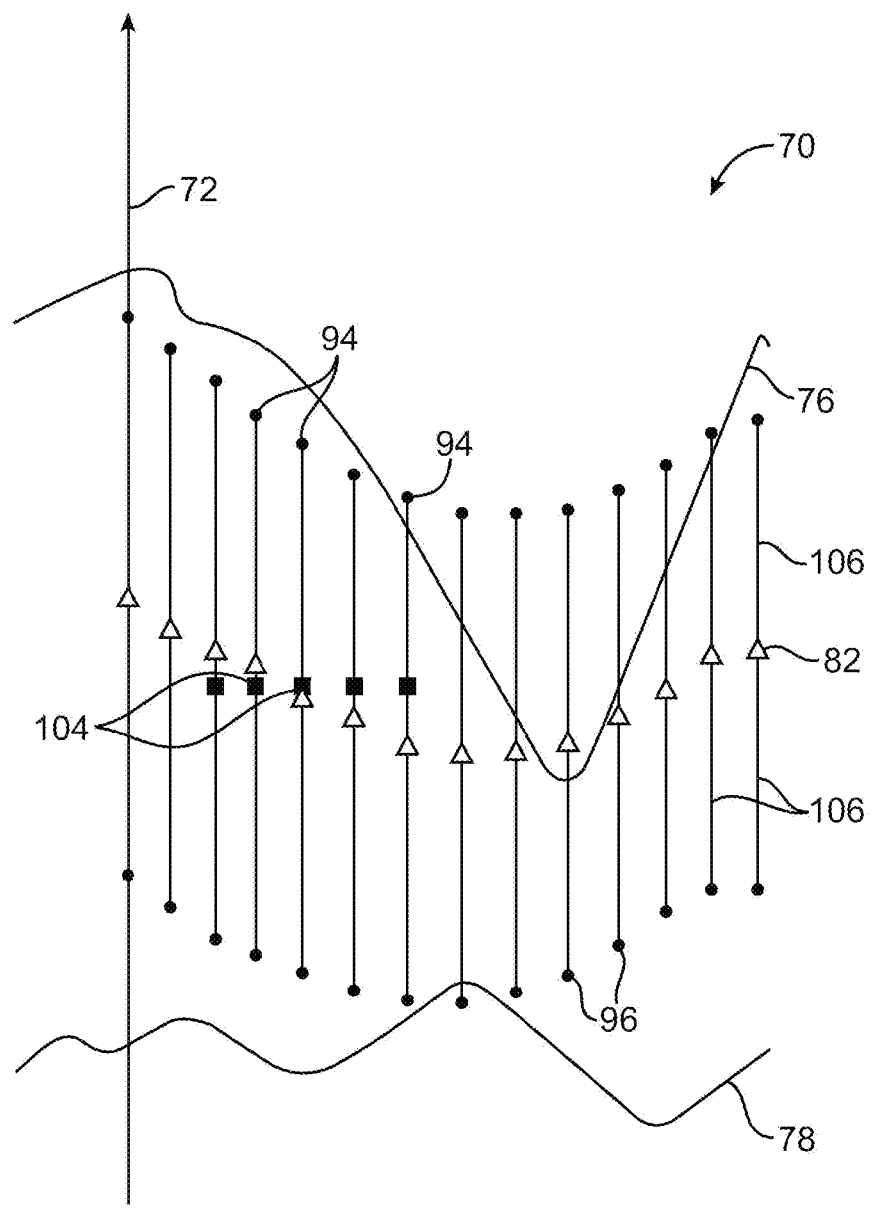
FIG. 9 is a portion of an illustrative bid evaluation screen showing how the bid evaluation tool may display a proposed bid, forecast maximum, minimum, and average price values, and historical price data in accordance with the present invention.

An illustrative display format for graph 70 in which both historical data and forecast data are displayed to provide context to a proposed bid is shown in FIG. 9. In the example of FIG. 9, the proposed bid is represented by black squares 104. The bid price in this example is based on a flat bid format. Average forecast data is represented by triangles 82. Dots 94 and 96 and connecting bars 106 are used to convey information about forecast maximum and minimum prices. Historical data is represented by maximum price line 76 and minimum price line 78. If desired, the historical data displayed in graph 70 of FIG. 9 can include data for multiple historical date ranges, as described in connection with FIG. 6. With the type of display format used in FIG. 9, the user is provided with information on the proposed bid price for the term of the proposed contract (five time periods in this example). The user is simultaneously provided with historical data and forecast data to provide context for the proposed bid price. This allows the user to evaluate whether the proposed bid is suitable before the user conveys the bid to a seller.

Figure 10:
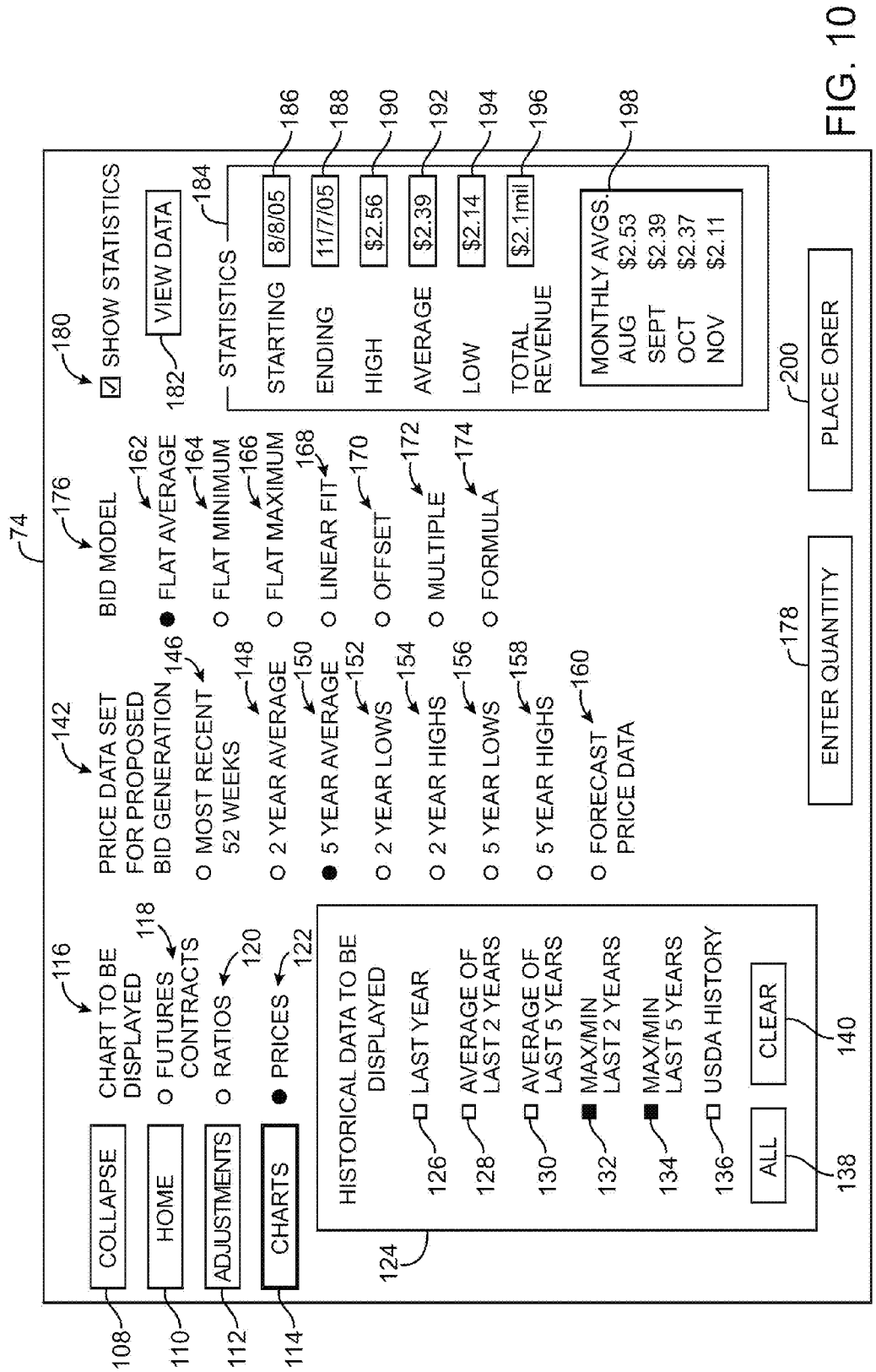
FIG. 10 is an illustrative bid window that may be displayed as part of a bid evaluation screen of the type shown in FIG. 5 in accordance with the present invention.

An illustrative bid window 74 that may be displayed in bid evaluation screen 68 of FIG. 5 is shown in FIG. 10. Bid window 74 contains on-screen options that a user can click on to adjust settings and to provide other suitable user input data to bid evaluation tool 30.

Option 108 may be used to change the display format for window 74 (e.g., to hide the window). If the user selects option 110, the bid evaluation tool 30 displays a home screen with additional options. The additional options may include an option for selecting a type of product (e.g., rib eye, ground beef, etc.). The options may also be used to select a buyer type (e.g., retail, food service, distributor, etc.). Settings that may be modified include offsets that allow a user to adjust a futures-based forecast up or down by a given amount. Option 112 can be selected to access tools for modifying the settings of tool 30. Settings that may be modified include settings that control which forecast techniques are used for the tool's forecasting feature, which data is used in performing bid generation operations and forecasts, and other suitable settings. Charts option 114 may be selected to make adjustments to the type of data that is displayed on screen 68 (FIG. 5). In the example of FIG. 10, the user has selected charts option 114, so charts option 114 is highlighted and window 74 contains options related to adjusting graph 70 of screen 68.

Historical data selection region 124 contains options that are used to adjust which historical data is displayed in graph 70. Option 126 may be used to select whether or not to display recent price data points 80 (FIG. 5). Options 128 and 130 may be used in choosing whether or not to display a curve representing average historical data over a two-year or five-year period. Option 132 is used to display curves such as curves 76 and 78 (FIG. 5) for a two-year period. Option 134 is used to display curves such as curves 84 and 86 (FIG. 6) covering a five-year data sample. If desired, both options 132 and 134 may be selected simultaneously, as shown in FIG. 10, so that graph 70 contains historical data covering two distinct date ranges, as shown in FIG. 6. USDA price history data can be displayed on graph 70 by clicking on option 136. The user can select all of the options in region 124 by clicking on all option 138. Clear option 140 is used to clear the selected options in region 124. The options of region 124 are merely illustrative. Any suitable historical data may be included in graph 70 if desired.

Region 116 contains options related to chart selection. If option 118 is selected, a graph containing futures contracts is displayed (e.g., with cattle prices from Chicago Mercantile Exchange futures contracts). If option 120 is selected, normalized price data is displayed such as historical meat sales prices adjusted to take into account underlying cattle prices. Option 122 has been selected in the present example, so a graph 70 of the type shown in FIG. 5 is displayed that includes unnormalized commodity prices (e.g., meat price per pound).

Region 142 contains options related to the selection of which data set is to be used by the bid evaluation tool 30 when generating the proposed bid. Option 146 can be selected when it is desired to use the user's commodity sales price data from the most recent 52 weeks as the proposed bid generation data set. Option 148 is selected to use historical two-year average price data for the data set. Option 150 is selected to use historical five-year average user price data in the data set. Maximum historical price data can be chosen for the data set by selecting option 154 (two-year highs) or option 158 (five-year highs). Minimum historical price data can be used for the data set by selecting option 152 (two-year lows) or 156 (five-year lows). The user can select option 160 to use forecast data as the data set on which the bid evaluation tool 30 will generate its proposed bid.

Bid model region 176 contains options related to the type of bid generation technique that the bid evaluation tool 30 uses to create the proposed bid. Bids are generally created based on data in a user-selected data set (e.g., forecast data, historical five-year average data, etc.). If option 162 is selected, the tool 30 will generate a proposed bid for the term of the contract using a flat bid format (not varying for the term of the contract) with a fixed price that is tied to the average data set price for the term. The flat minimum option 164 is used to tie a flat bid price to the minimum data set price for the term. Flat maximum option 166 can be used to direct the bid evaluation tool 30 to tie the flat bid price to the maximum data set price during the contract term. Linear option 168 is selected to choose a linear fit bid price format, as described in connection with proposed bid C of FIG. 8. Selecting offset option 170 directs the bid evaluation tool 30 to create a bid proposal by adding an offset to the data set prices (e.g., a fixed positive increase in price). Numeric multiple option 172 can be selected to raise the data set price by a given numeric ratio (e.g., a numeric multiple of 1.1). Formula option 174 may be selected to invoke a user-defined bid price creation formula. The user may enter the bid price creation formula using any suitable arrangement. For example, a previously grayed-out portion of window 74 may become active when option 174 is selected. The user can enter a desired formula in the active portion of the window.

If option 178 is selected, the user may be provided with a text entry box that allows the user to enter a desired quantity for the contract. Quantity information can be used in calculating expected revenues for the contract (e.g., by multiplying quantity by price and term data).

If option 180 is selected (as in the example of FIG. 10), statistics are displayed in region 184. View data option 182 can be selected to bring up a spreadsheet or other suitable financial or planning tool.

The user may define the starting and ending dates for the proposed commodity contract between the seller and buyer using any suitable format. For example, the user may enter a start date and term. As another example, the user may click on starting date option 186 to enter the starting date and may click on ending date option 190 to enter an ending date.

After the bid evaluation tool 30 has sufficient data, statistics related to the bid may be displayed. Region 190 may be used to display the highest forecast (or other data set) market price during the user-supplied contract term. Region 194 is used to display the lowest forecast (or other data set) price. Average region 192 is used to display the proposed price for the flat bid, because option 162 of region 176 has been selected in this example. Other display formats may be used to display proposed bid information for linear bids, offset bids, multiple bids, formula bids, etc.

Total revenue projections for the proposed contract can be displayed in a region such as region 196. Additional statistics such as monthly price averages extracted from the forecast data or historical data may be displayed in regions such as region 198.

After a bid has been accepted and a contract formed between a seller 14 and buyer 18, the user (i.e., the seller) may submit a corresponding order to a production facility 22 (FIGS. 1 and 2) by clicking on place order option 200. Clicking on option 200 (and providing additional order details in subsequent screens, if desired) transmits a production order for the commodity to the production facility over network 42 (FIG. 3). The production facility can use computer equipment 44 to receive the order and production equipment 46 (FIG. 3) to fulfill the order. The commodity produced by the production facility may then be delivered to the buyer who purchased the commodity from the seller.

Figure 11:
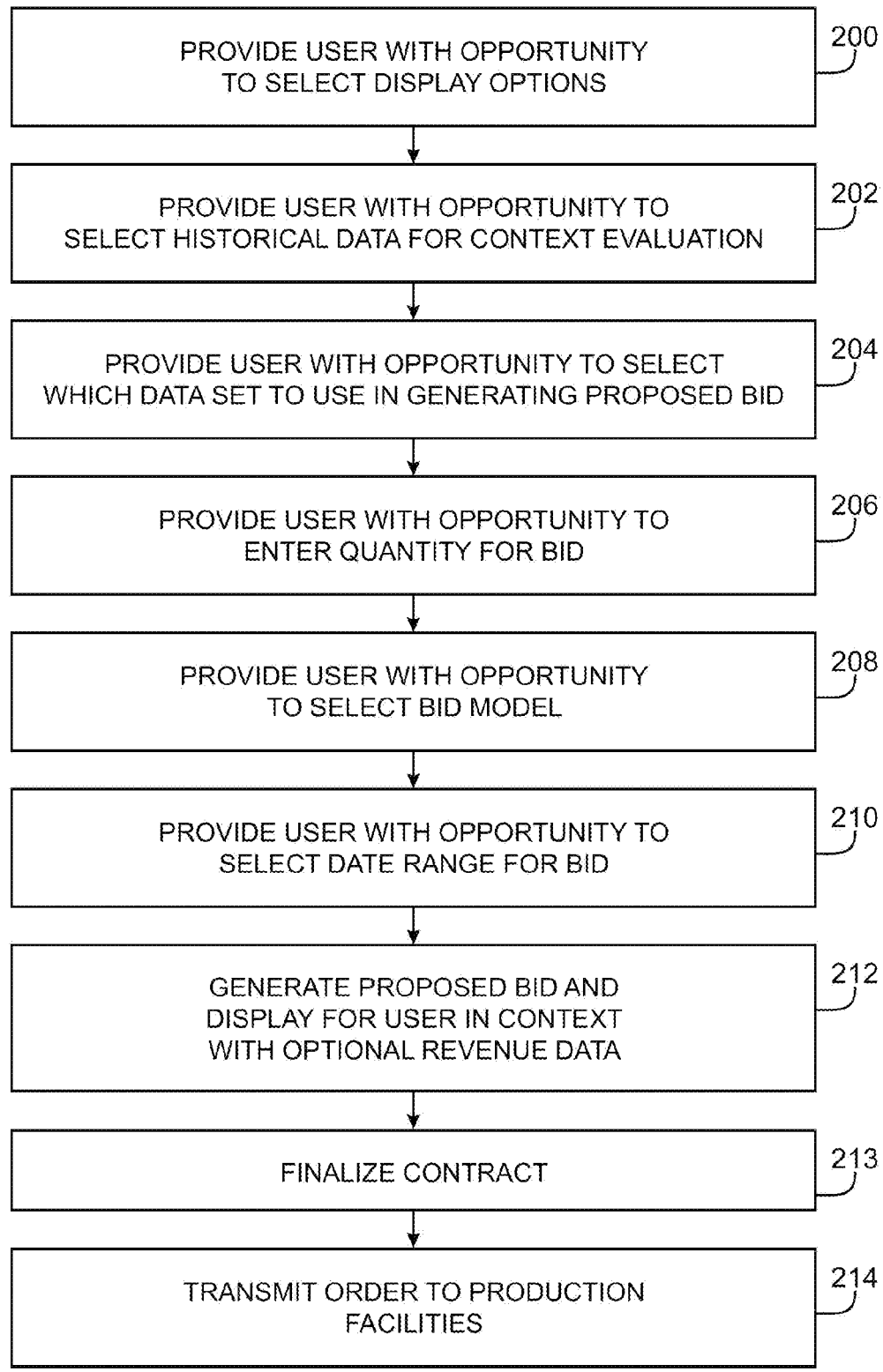
FIG. 11 is a flow chart of illustrative steps involved in using a bid evaluation tool to evaluate commodity contract bids and to place commodity production orders in accordance with the present invention.

Illustrative steps involved in using bid evaluation tool 30 are shown in FIG. 11. During the steps of FIG. 11 tool 30 displays on-screen options such as the options of bid window 74 (FIGS. 5 and 10) or otherwise provides the user with an opportunity to supply user inputs to the tool. The inputs that are gathered from the user in this way are used to adjust tool settings.

The options of step 200 relate to display options such as the chart to be displayed options of region 116. The display options that are chosen by the user during step 200 dictate whether a graph or prices or other information is displayed in bid evaluation screen 68 of FIG. 5.

During step 202 of FIG. 11, the bid evaluation tool 30 provides the user with an opportunity to select which historical data is to be displayed in the graph 70 on the bid evaluation screen 68. For example, the tool 30 may present the user with the data to be displayed options of region 124 in bid window 74 of FIG. 10. The user may select from options such as average of last 5 years option 130 to direct the tool 30 to display the desired historical information. By gathering user input on which historical price data to include in graph 70, tool 30 allows the user to customize the historical data used for providing context to the bid.

At step 204, the bid evaluation tool 30 provides the user with an opportunity to select which data set is to be used by the bid evaluation tool 30 when generating the proposed bid for the date range covered by the proposed contract. The bid evaluation tool 30 may, for example, display on-screen data set selection options such as the options of region 142 in the example of FIG. 10.

At step 206, the bid evaluation tool 30 provides the user with an opportunity to enter quantity information for the proposed contract. The user may, for example, select enter quantity option 178 of bid window 74 (FIG. 10) to provide quantity information. The quantity information may be combined with price and term information by the bid evaluation tool 30 to calculate the revenue for a contract.

At step 208, the bid evaluation tool 30 provides the user with an opportunity to select a bid model. For example, the bid evaluation tool 30 may display on-screen options such as the options in bid model region 176 of bid window 74 (FIG. 10) and may gather input from the user when the user clicks on selected options. Bid model choices dictate how the bid evaluation tool 30 computes proposed bids based on forecast data and date range information.

Step 210 involves using the bid evaluation tool 30 to provide the user with an opportunity to select a date range for the bid and contract. In the example of bid window 74 in FIG. 10, starting and ending date options 186 and 188 are used to supply bid date range information. This is merely one illustrative technique that can be used define the date range for the proposed contract. If desired, the date range may be specified by entering a starting date and a contract term or by specifying an ending date and a term. Moreover, using text entry boxes to define the range dates is merely illustrative. Dates may also be entered using a drop-down menu, buttons, by right-clicking to bring up a menu or dialog box, etc.

In general, the operations of steps 200, 202, 204, 206, 208, and 210 may be performed simultaneously or in any suitable order. Moreover, the operations of steps 200, 202, 204, 206, 208, and 210 are not mutually exclusive. For example, bid window 72 may contain an option that combines historical price data display choices of the type contained in region 124 with bid model choices of the type contained in region 176.

The use of bid window 74 to obtain user input is also illustrative. In general, any suitable user interface may be used by the bid evaluation tool 30 to obtain user input data such as drop down menus, pop-up windows, on-screen buttons, adjustable sliders, options invoked by selecting on-screen buttons, options invoked by right-clicking and/or making menu selections, etc.

After bid evaluation tool 30 has provided the user with an opportunity to supply suitable user input data and has gathered the user input data from the user, the bid evaluation tool generates a proposed bid at step 212. During step 212, the bid evaluation tool 30 uses information on the dates for the contract and commodity price data from the appropriate user-selected or default data set to compute a proposed bid. During bid generation, the tool 30 uses the bid model(s) selected by the user or a default bid model.

Information on the proposed bid is preferably displayed visually in the context of historical and/or forecast pricing data, as described in connection with graph 70. This context data provides the user with a visual indicator of price trends and volatility (risk) during the term of the proposed contract. Both graph data points such as points 104 and text information such as the bid price information of box 102 in FIG. 5 may be displayed for the user. Additional bid information such as projected revenue information in box 196 of FIG. 10 can also be displayed, provided that sufficient information has been provided to the tool 30 (e.g., provided that the quantity of commodity to be sold has been supplied by the user in this example).

At step 213, the buyer and seller agree on the terms of the contract. During step 213, the buyer accepts the seller's bid. Any suitable arrangement may be used by the buyer and seller to finalize the contract. For example, a seller may accept the buyer's bid over the telephone or via fax. With one suitable arrangement, the buyer uses computing equipment 36 of FIG. 3 to convey acceptance of the bid to the seller. The buyer may, as an example, log in to a web site provided by the buyer. Once the buyer has logged in, the buyer can click on an "accept" button or use other suitable on-screen options to indicate acceptance of the bid. The web site may be operated by the seller (e.g., using equipment 32 of FIG. 3) or the buyer's acceptance of the bid may be conveyed from a remotely-hosted web site to the buyer at equipment 30 over network 42. Email and other electronic communications may also be used in addition to or as an alternative to web-based bid-acceptance communications arrangements. On the seller's equipment, information on the status of a contract (i.e., whether an outstanding bid has been accepted by a seller) can be conveyed using a pop-up window on a screen such as screen 68 of FIG. 5, another suitable screen provided by bid evaluation tool 30, or any other suitable on-screen interface or notification arrangement operating on equipment 30.

After the seller's bid has been accepted by a buyer, the seller uses the bid evaluation tool 30 to transmit a corresponding electronic order to a production facility (step 214). The production facility fulfills the order and provides the commodity to the seller.

The foregoing is merely illustrative of the principles of this invention and various modifications can be made by those skilled in the art without departing from the scope and spirit of the invention.

What is claimed is:

1. A method for using a computer-implemented bid evaluation tool to allow a seller to evaluate bids for a sales contract for the sale of a product to a buyer, comprising:
   providing the seller with an opportunity to define a date range for the sales contract using the bid evaluation tool, wherein the date range includes at least two days;
   with a computer display screen, displaying forecast price data for the product in a graph on a bid evaluation screen using the bid evaluation tool;
   with the computer display screen, displaying historical price data for the product in the graph using the bid evaluation tool;
   with processing circuitry, generating a proposed bid based on a product price data set and the defined date range using the bid evaluation tool; and
   with the computer display screen, displaying information on the proposed bid on the bid evaluation screen using the bid evaluation tool, wherein the date range for the sales contract begins on a start date and ends on an end date, wherein there are a plurality of given days within the date range, wherein the sales contract specifies a bid price for each of the given days, and wherein at least some of the product is delivered to the buyer on each of the plurality of given days according to the bid price for that given day.

2. The method defined in claim 1 wherein the product comprises a commodity and wherein the product price data set comprises a commodity price data set, the method further comprising using the bid evaluation tool to provide the seller with an opportunity to select which commodity price data set is used by the bid evaluation tool when generating the proposed bid.

3. The method defined in claim 1 wherein the product comprises a commodity, wherein the product price data set comprises a commodity price data set, wherein the commodity price data set comprises forecast data, and wherein generating the proposed bid comprises generating the proposed bid based on the forecast data and the defined date range using the bid evaluation tool.

4. The method defined in claim 1 wherein displaying the information on the proposed bid on the bid evaluation screen comprises displaying the information on the proposed bid on the graph.

5. The method defined in claim 1 wherein displaying information on the proposed bid on the bid evaluation screen using the bid evaluation tool comprises displaying information on a proposed bid price on the graph as data points extending over the date range.

6. The method defined in claim 1 further comprising:
   using the bid evaluation tool to provide the seller with an opportunity to select which historical price data is to be displayed in the graph.

7. The method defined in claim 1 wherein the bid evaluation tool uses a bid model in generating the proposed bid, the method further comprising:
   using the bid evaluation tool to provide the seller with an opportunity to select which bid model the bid evaluation tool uses in generating the proposed bid.

8. The method defined in claim 1 further comprising:
   using the bid evaluation tool to provide the seller with an opportunity to select at least one bid model from a plurality of bid models for the bid evaluation tool to use in generating the proposed bid from forecast price data for the product and the defined date range.

9. The method defined in claim 1 further comprising:
   using the bid evaluation tool to provide the seller with an opportunity to select a flat bid model from a plurality of available bid models for the bid evaluation tool to use in generating the proposed bid.

10. The method defined in claim 1 further comprising:
    using the bid evaluation tool to provide the seller with an opportunity to select a non-flat linear bid model that produces non-flat linear bids from a plurality of available bid models for the bid evaluation tool to use in generating the proposed bid.

11. The method defined in claim 1 further comprising:
    using the bid evaluation tool to provide the seller with an opportunity to select an offset bid model from a plurality of available bid models for the bid evaluation tool to use in generating the proposed bid.

12. The method defined in claim 1 further comprising:
    using the bid evaluation tool to provide the seller with an opportunity to select a numeric ratio bid model from a plurality of available bid models for the bid evaluation tool to use in generating the proposed bid from forecast price data for the product and the defined date range, wherein the numeric ratio bid model is used to compute the proposed bid by multiplying the forecast price data for the product by a numeric ratio.

13. The method defined in claim 1 wherein displaying the historical price data for the product in the graph using the bid evaluation tool comprises displaying historical price data selected from the group consisting of: price data for a preceding period of a length selected by the seller, historical maximum price data for a given period of time, historical minimum price data for a given period of time, and historical average price data for a given period of time.

14. The method defined in claim 1 wherein providing the seller with the opportunity to define the date range for the sales contract comprises using the bid evaluation tool to provide the seller with on-screen options for defining the start date and the end date for the sales contract.

15. The method defined in claim 1 wherein the sales contract includes a plurality of given weeks within the date range, wherein the sales contract specifies a bid price for each of the given weeks, and wherein at least some some of the product is delivered to the buyer each of the plurality of given weeks according to the bid price for that given week, the method further comprising:

displaying proposed bid prices for each given week of the sales contract for the seller in the graph while simultaneously displaying the forecast and the historical data in the graph.

16. The method defined in claim 1 wherein the sales contract comprises a contract for meat that begins on the start date and ends on the end date and that includes a plurality of given weeks, wherein the sales contract specifies a bid price for each of the given weeks, and wherein at least some of the meat is delivered to the buyer each of the plurality of weeks according to the bid price for that given week, the method further comprising:

displaying proposed bid prices for each given week of the sales contract for the seller as data points in the graph while simultaneously displaying the forecast and the historical data in the graph.

17. The method defined in claim 1 wherein the sales contract comprises a contract for meat that begins on the start date and ends on the end date and that includes a plurality of given weeks, wherein the sales contract specifies a bid price for each of the give weeks, and wherein at least some of the meat is delivered to the buyer each of the plurality of weeks according to the bid price for that given week, the method further comprising:

displaying proposed bid prices for each given week of the sales contract for the seller as data points in the graph while simultaneously displaying the forecast and the historical data in the graph, wherein the historical data includes historical data covering at least two distinct date ranges.

18. The method defined in claim 1 further comprising:

using the bid evaluation tool to electronically transmit an order for the product to a production facility over a communications network.

19. The method defined in claim 1 further comprising:

using the bid evaluation tool to display a bid window as an overlay on top of the graph in the bid evaluation screen, wherein the bid evaluation window includes on-screen options and information on the proposed bid.

20. The method defined in claim 1 wherein the product is a manufactured product and wherein displaying information on the proposed bid on the bid evaluation screen using the bid evaluation tool comprises displaying information on a proposed bid for the manufactured product.

21. The method defined in claim 1 wherein the product is a commodity and wherein displaying information on the proposed bid on the bid evaluation screen using the bid evaluation tool comprises displaying information on a proposed bid for the commodity.

22. The method defined in claim 1 wherein the product is a seasonal commodity and wherein displaying information on the proposed bid on the bid evaluation screen using the bid evaluation tool comprises displaying information on a proposed bid for the seasonal commodity.

\* \* \* \* \*